United States Patent [19]
Daoud

[11] Patent Number: 6,095,461
[45] Date of Patent: Aug. 1, 2000

[54] APPARATUS AND METHOD FOR REDUCING WEAR ON A CONDUCTOR

[75] Inventor: Bassel Hage Daoud, Parsippany, N.J.

[73] Assignee: Lucent Technologies Inc., Murray Hill, N.J.

[21] Appl. No.: 09/045,172

[22] Filed: Mar. 19, 1998

[51] Int. Cl.[7] .............................. F16L 3/08; H01R 13/60
[52] U.S. Cl. .............................. 248/65; 248/68.1; 248/71
[58] Field of Search .................................. 248/65, 51, 52, 248/68.1, 74.1, 74.3; 379/399, 438, 326, 412; 361/683, 641, 644, 645, 657, 823, 824, 755, 752, 796, 724, 826, 827, 828; 174/65 R, 72 A; 49/502; 108/50.02; 312/405, 405.1, 223.6

[56] References Cited

U.S. PATENT DOCUMENTS

| | | | |
|---|---|---|---|
| 2,726,914 | 12/1955 | Allen | 312/405 |
| 4,660,125 | 4/1987 | Purdy et al. | 361/827 X |
| 5,363,440 | 11/1994 | Daoud | 379/399 |
| 5,521,973 | 5/1996 | Peng | 361/826 X |
| 5,653,409 | 8/1997 | White, Jr. et al. | 248/74.3 X |
| 5,809,403 | 9/1998 | MacDonald, Jr. et al. | 455/90 |
| 5,816,854 | 10/1998 | Baggett et al. | 439/540.1 |
| 5,868,362 | 2/1999 | Daoud | 248/68.1 X |

Primary Examiner—Anita M. King
Attorney, Agent, or Firm—Stroock & Stroock & Lavan LLP

[57] ABSTRACT

Apparatus and method for reducing the wear on a wire traversing a pivot or hinge and extending from first wiring layer to a second wiring layer that is pivotably attached to the first wiring layer by the hinge for pivotable angular movement from a closed position, in which the second wiring layer is in overlying relationship with the first wiring layer, to an opened position, in which the second wiring layer is pivoted away from the first wiring layer. A first wire guide is disposed on the first wiring layer and the second wire guide is disposed on the second wiring layer. The wire guides channel the wire so that should the second wiring layer be in the closed position, the wire would be subjected to both rotational and bending forces.

16 Claims, 9 Drawing Sheets

APPARATUS AND METHOD FOR REDUCING WEAR ON A CONDUCTOR

FIELD OF THE INVENTION

This invention relates to an apparatus and method for reducing wear on single or multi-conductor wires and cables, especially those which must traverse hinged layers of multilayered wiring units.

BACKGROUND OF INVENTION

Multilayered wiring units are advantageously used to support a multiplicity of telephone subscribers where space is at a premium. For example, in FIG. 1, there is shown a multilayered wiring unit 17 for connecting customer telephone equipment to a central office. Multilayered wiring unit 17 includes a bottom wiring layer 7 having a splice chamber and an array of protector devices mounted thereon. The splice chamber includes connectors for connecting a cable to the protectors. A top wiring layer 5 includes an array of customer bridges, each adapted for coupling to a particular subscriber line. The array of bridges is electrically coupled to the protector array through at least one removable electrical connecting cable 3. Top wiring layer 5 is pivotably attached to bottom wiring layer 7 by a hinged member 9 so that top wiring layer 5 may be opened to reveal bottom wiring layer 7. In this way, access to the protector devices is provided while keeping the total "footprint" of the wiring unit at a minimum. A more detailed description of such prior art multilayered wiring units is provided in U.S. Pat. No. 5,363,440, the entire contents of which is incorporated herein by reference.

One significant drawback of multilayered wiring unit 17 of the prior art is that connecting cable 3 traversing hinged member 9 is subject to stress and wear caused by the repeated opening and closing of top wiring layer 5. Top wiring layer 5 may be opened and closed hundreds of times by technicians requiring access to bottom wiring layer 7 to perform additional installations or system troubleshooting. As a result of these repeated openings and closings, excessive bending stress is placed on the portion of connecting cable 3 traversing hinged member 9 which may cause an electrical failure in connecting cable 3.

A test was performed to determine the amount of bending stress connecting cable 3 could withstand before failing as a result of repeated openings and closings. The test employed a test unit that opened and closed a simulated hinge portion of a multilayered wiring unit twelve times per minute. A typical twenty-five pair (50 conductor) cable was connected between a top wiring layer and a bottom wiring layer in a conventional manner. All the wires in the cable were attached in such a way as to create one single conductor connected in series between a light and a power supply so that if any wire of the fifty broke, the light would either flicker or go out. It was found that after 405 opening and closing cycles, the light went out, indicating that a wire in the cable electrically failed as a result of excessive bending stress. This high failure rate is unacceptable especially for heavily used multilayered wiring units.

Accordingly, a multilayered wiring unit in which there is reduced stress and wear on the connecting cable or individual conductors traversing the hinge member between the multiple layers is desirable.

SUMMARY OF THE INVENTION

The present invention provides apparatus and methodology which may be suitably applied to multilayered wiring unit in which it is desirable for the stress and wear on the connecting cable traversing the hinge between multiple layers is reduced. The multilayered wiring units to which the present invention applies generally include a first wiring layer and a second wiring layer that is pivotably attached via a hinge to the first wiring layer and coupled to the first wiring layer via a connectorized, multi-conductor connecting cable, or individual conductors which may or may not be bundled together, as with, for example, wire wraps or cable ties. For ease of use herein, such cables and wires shall be referred to interchangeably as "cable" or "wire", it being understood that the generic term cable or wire is intended to mean any multi-conductor cable or wire in a single sheath and/or individual conductors or groups of conductors, or other elongated strand or strands of metal, which may or may not be bundled.

The second wiring layer can be pivoted from a closed position, in which the second wiring layer is in overlying relationship with the first wiring layer, to an open position, in which the second wiring layer is pivoted away from the first wiring layer. The multilayered wiring unit also includes a first set of wire guides being disposed on the first wiring layer and a second set of wire guide being disposed on the second wiring layer. The wire guides channel the connecting cable in multiple directions so that when the second wiring layer is moved between the open and closed positions, the connecting cable is subject to both rotational, twisting and bending forces. In this way the bending stress and its resultant wear on the connecting cable is reduced and the life of the cable is extended.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
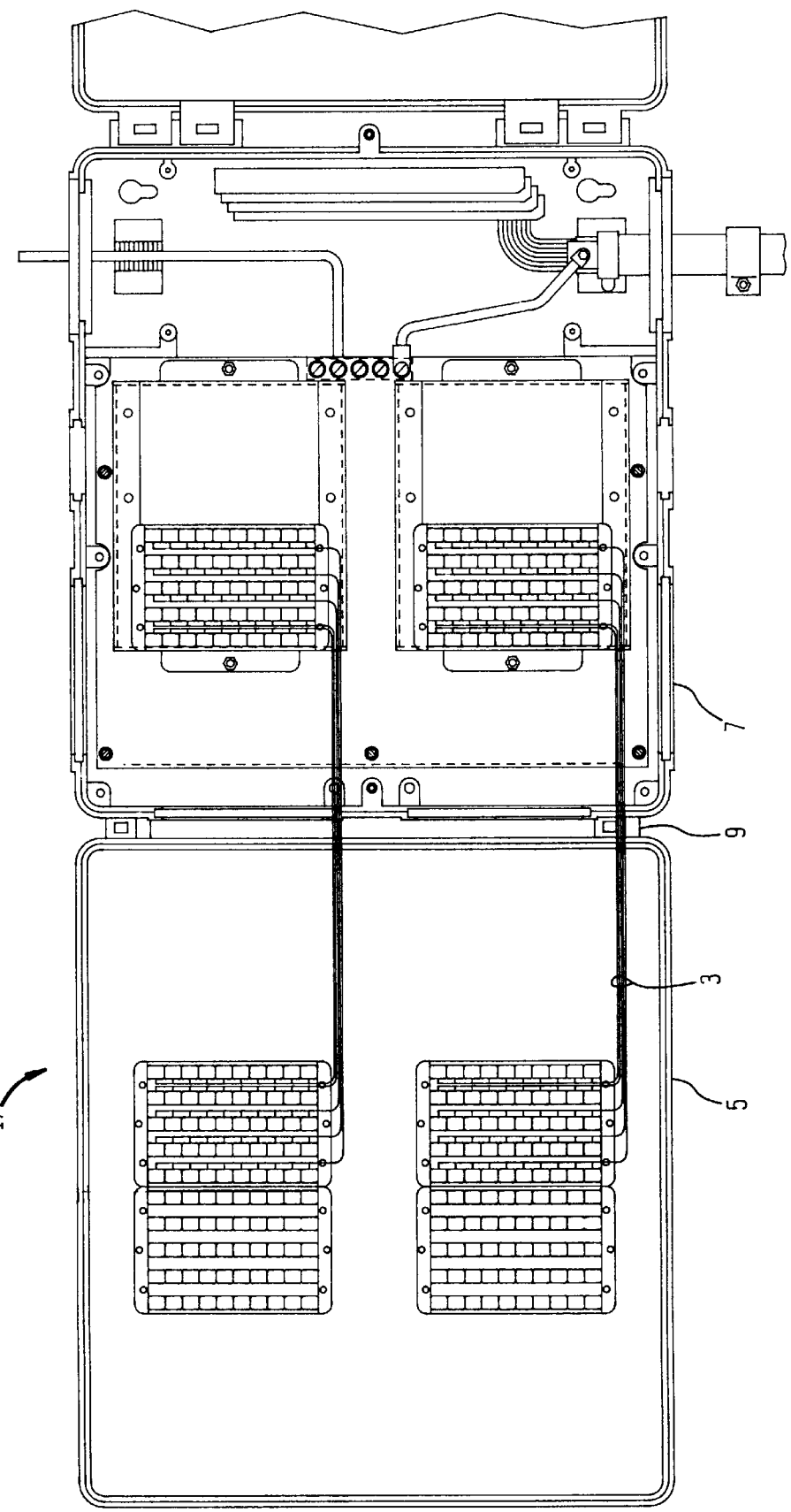
FIG. 1 is a front view of a prior art multilayered wiring unit in the opened position.
Figure 2:
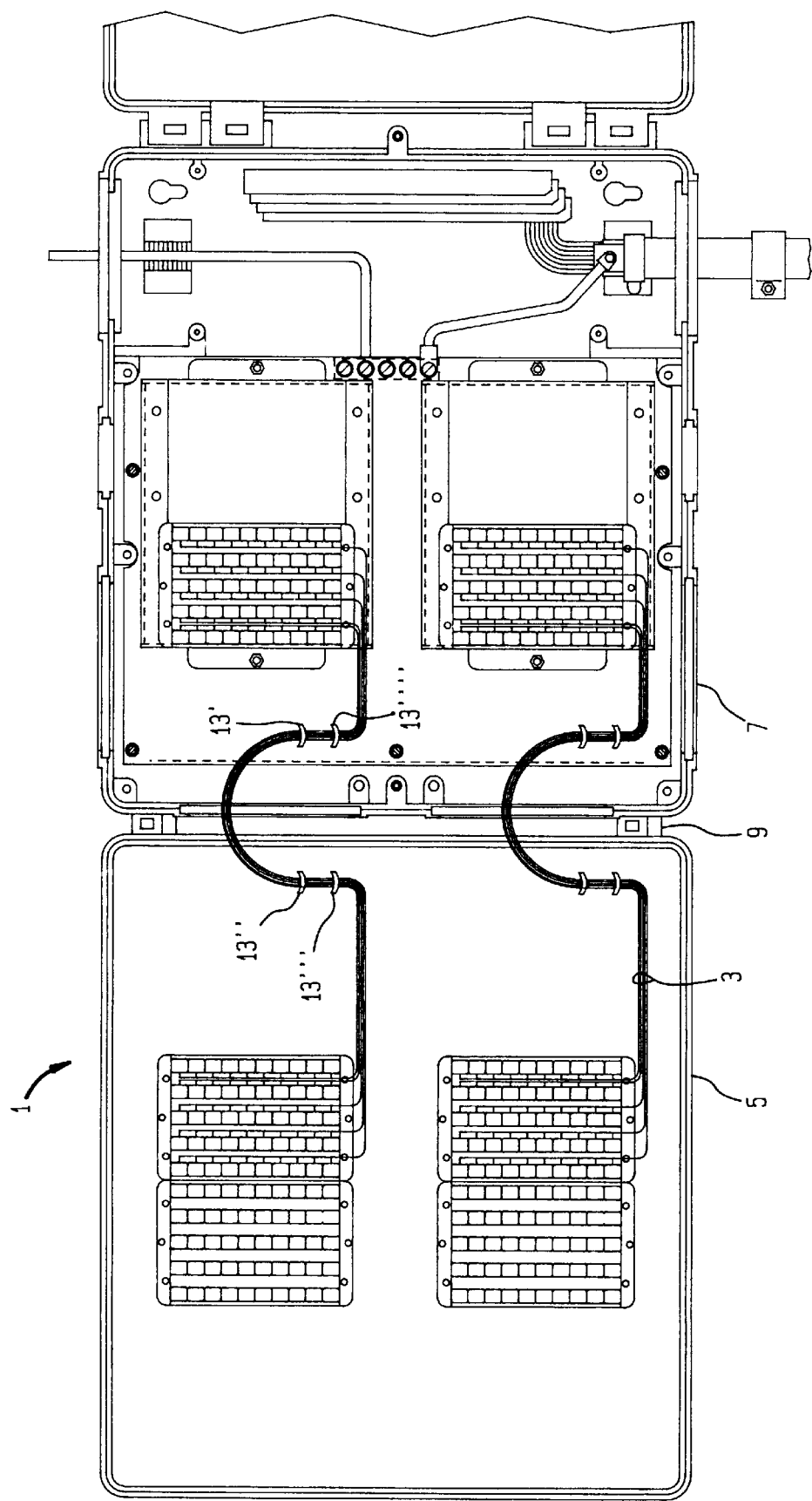
FIG. 2 is a front view of a multilayered wiring unit in the opened position utilizing the teachings of the present invention.
Figure 5:
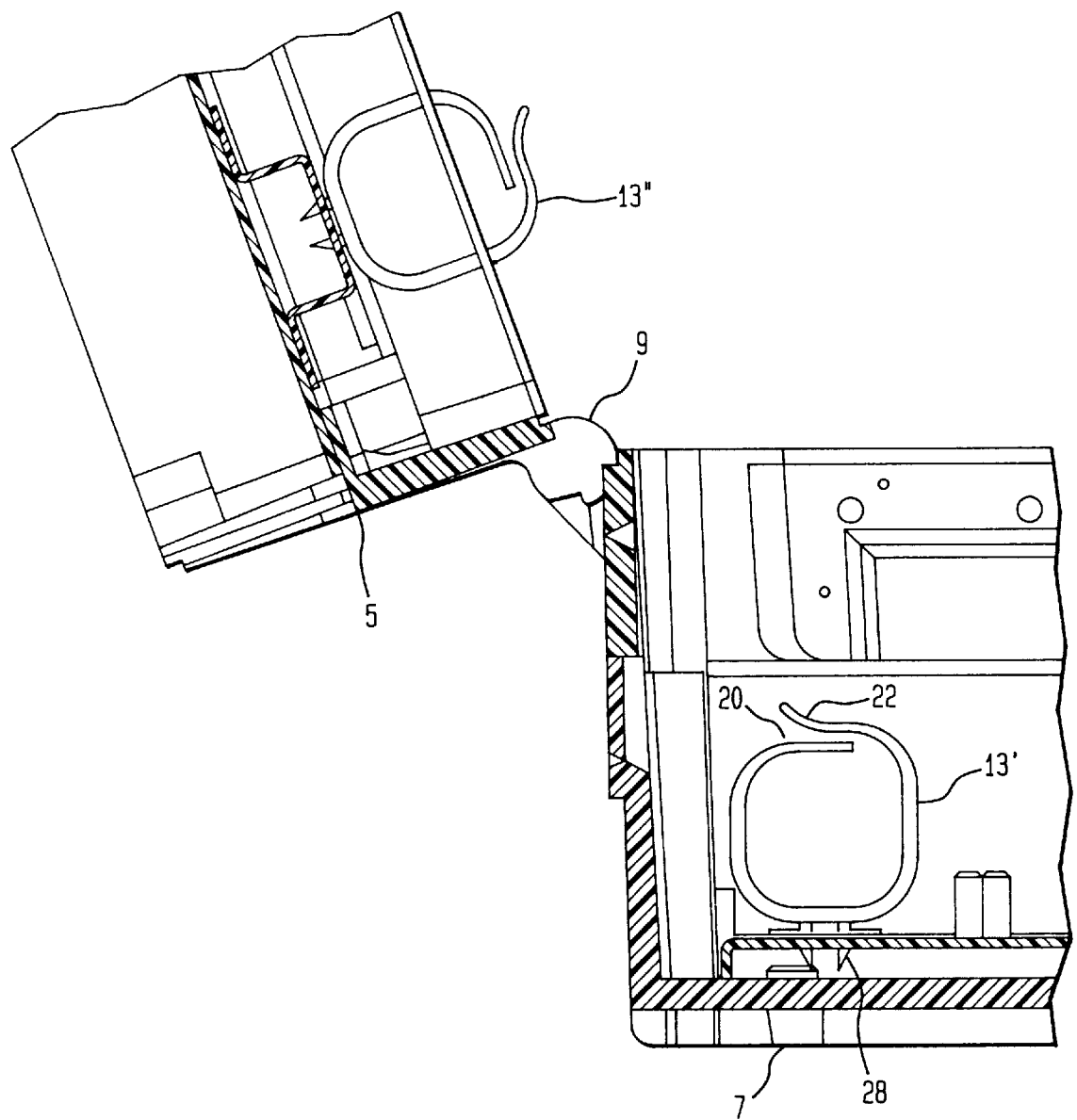
FIG. 5 is a bottom view of a multilayered wiring unit of FIG. 3.

Referring initially to FIGS. 2 and 5, there is shown a multilayered wiring unit I incorporating the present invention.

Connecting cable 3 is channeled across a pivot point, shown as hinge 9, through a plurality of wire guides 13, also called troughs, which are fixed to the surface multilayered wiring unit 1. Wire guide 13 is generally a ring shaped member having a diameter sufficiently large for receiving connecting cable 3 with or without out gripping it. Wire guide 13 preferably includes an entry point 20 through which connecting cable 3 can be inserted into the diameter of wire guide 13. A retaining member 22 extends beyond entry point 20 thereby securely retaining cable connector 3 inside wire guide 13. Connecting cable 3 may be removed from wire guide 13 by forcing open entry point 20 and withdrawing connecting cable 3. Wire guide 13 is preferably constructed from a resilient material, such as plastic, so that entry point 20 can be resiliently opened to receive or relinquish connecting cable 3. At the rear portion of wire guide 13 is a connecting member 28 for connecting wire guide 13 to multilayered wire unit 1. Alternatively, wire guide 13 may be constructed in any manner so long as connecting cable 3 can be easily inserted or removed from wire guide 13 and connecting cable 3. Cable 3 may or may not be gripped by wire guide 13, as an application specific matter of design choice, depending on the size and nature of the cable 3, and whether, as further discussed below, the cable can be routed into the desirable path for resulting in both twisting, rotational forces, and bending forces being exerted on said cable during opening an closing of unit 1.

Figure 3:
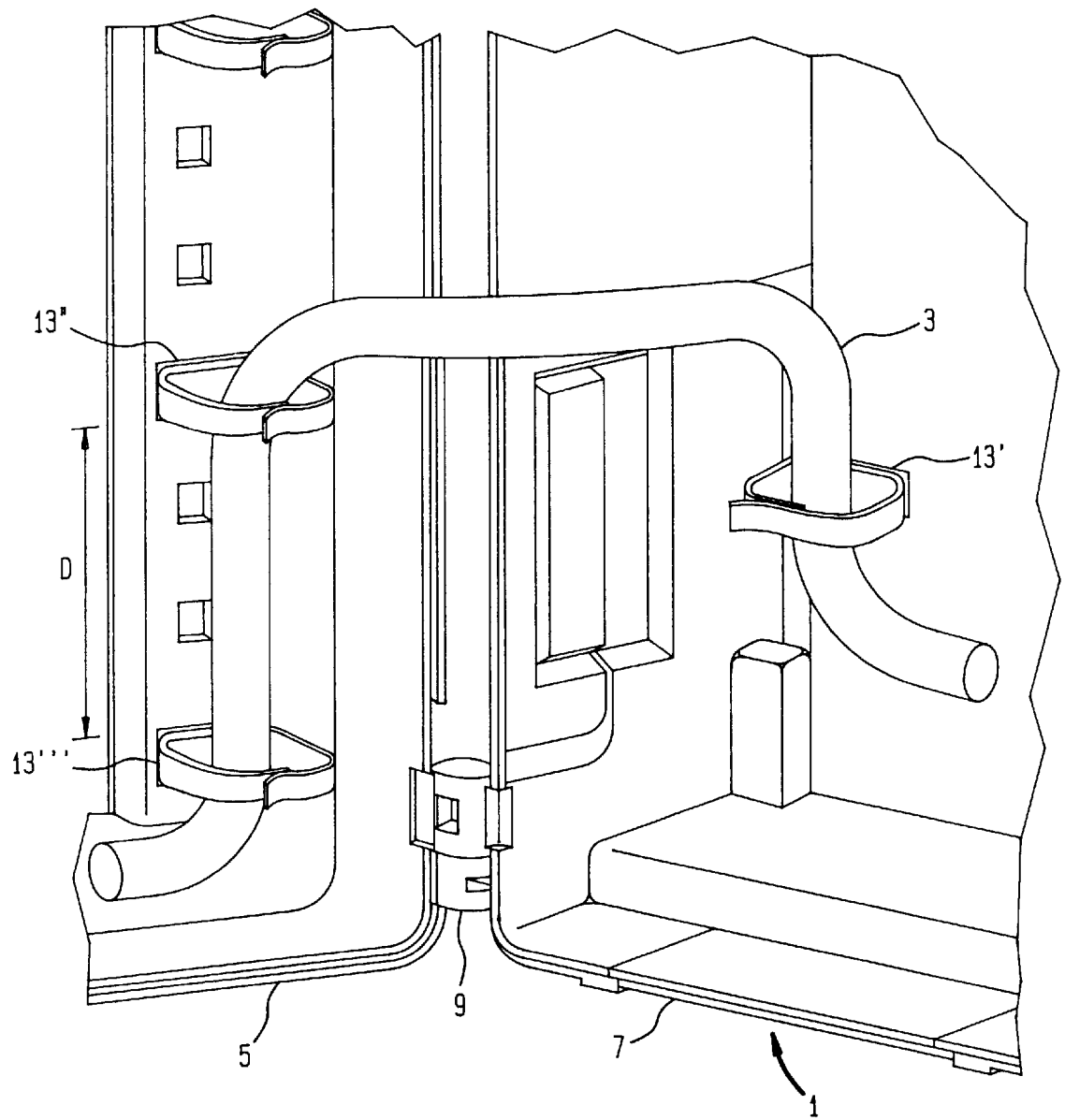
FIG. 3 is front perspective view of a multilayered wiring unit in the opened position constructed in accordance with a first embodiment of the present invention.

In the embodiment depicted in FIG. 3, a first bottom layer wire guide 13' is fixed to bottom wiring layer 7. A first top layer wire guide 13" is connected to top wiring layer 5 at a position generally opposite bottom layer wire guide 13'. A second top layer wire guide 13'" is fixed to top wiring layer 5 at a distance offset from wire guide 13". It is preferable that this offset distance be maximized to the extent allowed by the space constraints imposed by multilayered wiring unit 1 so that connecting cable 3 extends in a generally straight line for the maximum possible distance between first top layer wire guide 13" and second top layer wire guide 13'", although the actual offset distance will vary by cable type and unit configuration. The person of skill will readily appreciate, utilizing the teachings of the present invention, that the exact placement of wire guides and cable can be changed and modified, as required, so long as the desired twisting, rotational forces, and bending forces are both exerted on said cable during movement of the unit 1 from an open to a closed position.

Figure 4:
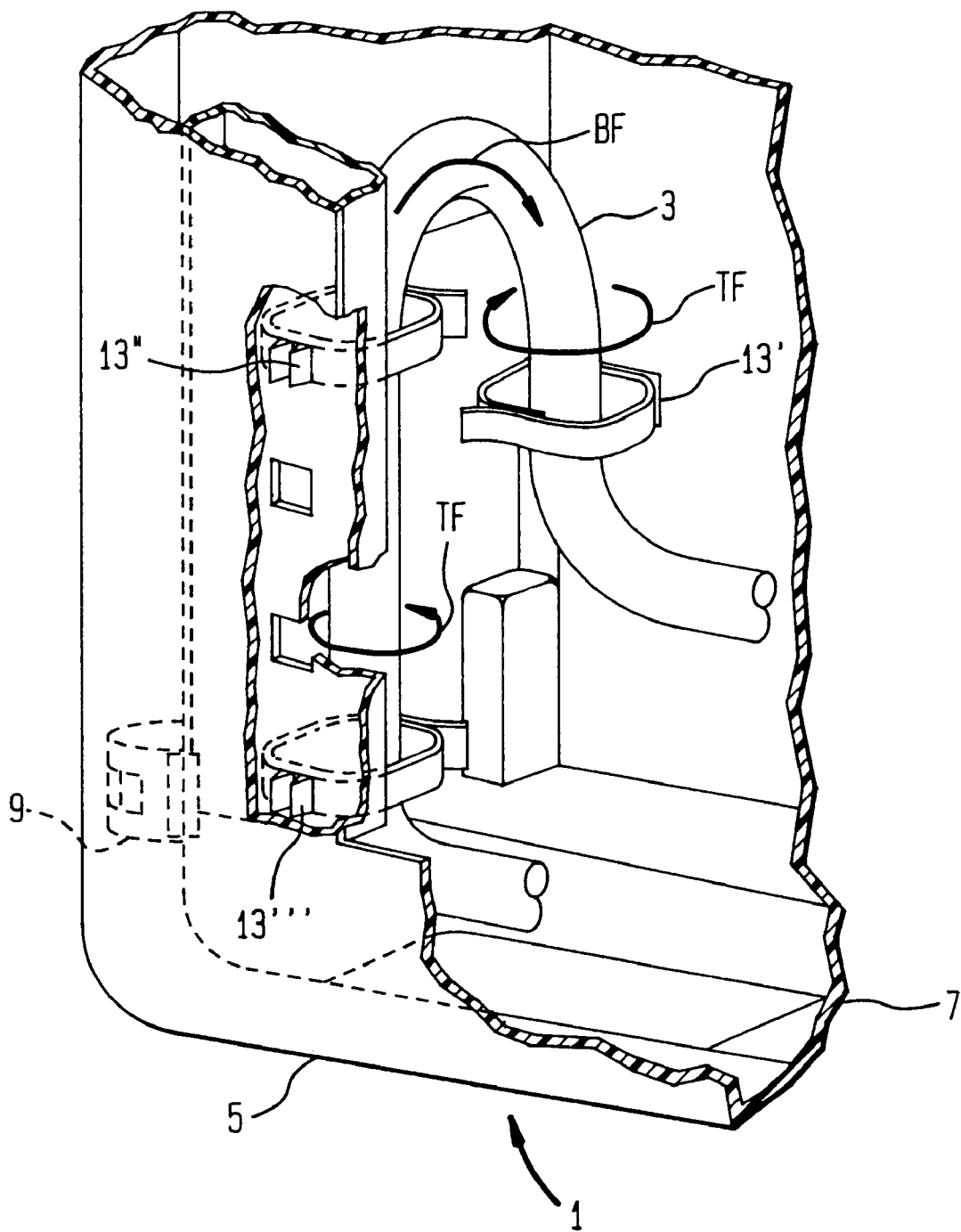
FIG. 4 is a front perspective view depicting a cable within the multilayered wiring unit of FIG. 3 when in the closed position.

Connecting cable 3 is inserted into wire guides 13', 13", 13'", as shown in FIG. 4. As shown, wire guides 13', 13", 13'" are positioned so that connecting cable 3 follows a generally U-shaped path across hinge 9 between wire guides 13' and 13" when multilayered wiring unit 1 is in the closed position. In a preferred embodiment, utilizing a connectorized twenty-five pair (50 conductor) telephone cable as well known in the art, the top of the generally U-shaped portion extends approximately 2½ inches above bottom layer wire guide 13'. Additionally, wire guides 13', 13" and 13'" should be so placed that there will be sufficient slack in connecting cable 3 so that when multilayered wiring unit 1 is in the opened position, there will no stretching forces placed on connecting cable 3 which could also lead to breakage or wear. Multilayered wiring unit 1 should therefore be preferably configured to have sufficient interior space so as to accommodate the slack required to form the desired U-shaped path in connecting cable 3 when multilayered wiring unit 1 is in the closed position. Additionally, although for simplicity the path across the hinge in the closed position is described as generally U-shaped, it is not necessary that the shape conform exactly to a "U", it being sufficient for the cable to follow a path that bends back upon itself at an angle, preferably between approximately 120 degrees and 250 degrees. Although, as discussed above and further below, it is the rotational or twisting force, combined with bending force, and not the precise angle of the cable path, that yields the beneficial results described herein.

When multilayered wiring unit 1 is in the open position, as shown in FIG. 3, connecting cable 3 extends from top layer wiring guide 13" to bottom layer wiring guide 13' and, because there is sufficient slack in connecting cable 3, top wiring layer 5 can be fully opened without stretching connecting cable 3. When top wiring layer 5 is moved into overlaying relationship with bottom wiring layer 7, i.e. when multilayered wiring unit 1 is closed, a bending force BF is applied along the longitudinal axis of connecting cable 3 by the movement of top wiring layer 5, causing connecting cable 3 to follow the above-described generally U-shaped path extending above bottom layer wire guide 13' and top layer wire guide 13".

In addition to the bending force BF, during closing a twisting, rotational force TF is applied about the longitudinal axis of connecting cable 3 that twists the portion of connecting cable 3 extending from second top layer wiring guide 13'" to the top of the generally U-shaped portion of connecting cable 3 and then down to bottom layer wire guide 13'. These forces reverse upon opening of the unit 1. Because the force that is exerted on cable 3 by closing multilayered wiring unit 1 results in a twisting of cable 3, less total bending force is applied to connecting cable 3 than in the prior art cable configurations within multilayered wiring units.

The test unit discussed above in connection with the prior art was applied to test the efficacy of the present invention. When a similar twenty five pair cable as that used in testing the prior art configuration was routed in the test device in accordance with the present invention, the connecting cable under test underwent 6,000 open/close cycles without failing, thus indicating that when connecting cable 3 is subjected to both rotational and bending forces during opening and closing, it life is appreciably extended.

Alternatively, as shown in FIG. 2, a second bottom layer wire guide 13"" may also be connected to bottom wiring layer 7 at a distance below bottom layer wiring guide 13'. In this configuration, the rotational forces exerted on connecting cable 3 will be generally spread out over a greater portion of connecting cable 3, i.e. from second top layer wiring guide 13'" to the top of the U-shaped section all the way to second bottom layer wiring guide 13"".

Alternatively, only bottom layer wiring guide 13' and top layer wiring guide 13" may be employed (not shown), in which case the rotational forces exerted on a connecting cable 3 will be distributed over the generally U shaped portion of connecting cable 3 that extends from bottom layer wiring guide 13' and top layer wiring guide 13". In either case, or any embodiment described or contemplated herein, by directing the forces generated by closing multilayered wiring unit 1 to twist as well as bend connecting cable 3, the life of connecting cable 3 will be greatly extended.

As shown in FIG. 2, the plurality of wires may be channeled individually or in groups from top wiring layer 5 to bottom wiring layer 7 forming the generally U shaped configuration described above. In this case, a plurality of sets of wire guides 13 are installed in multilayered wiring unit 1 with each set of wire guides 13 accommodating a single wire or group of wires, as required, on an application by application basis.

Referring now to FIGS. 6–9, there is a shown a second embodiment of the multilayered wiring unit 1 of the present invention. Like structures to those contained in the first embodiment described in FIGS. 2–5 are denoted with like reference numerals and a detail description thereof will be omitted.

Figure 6:
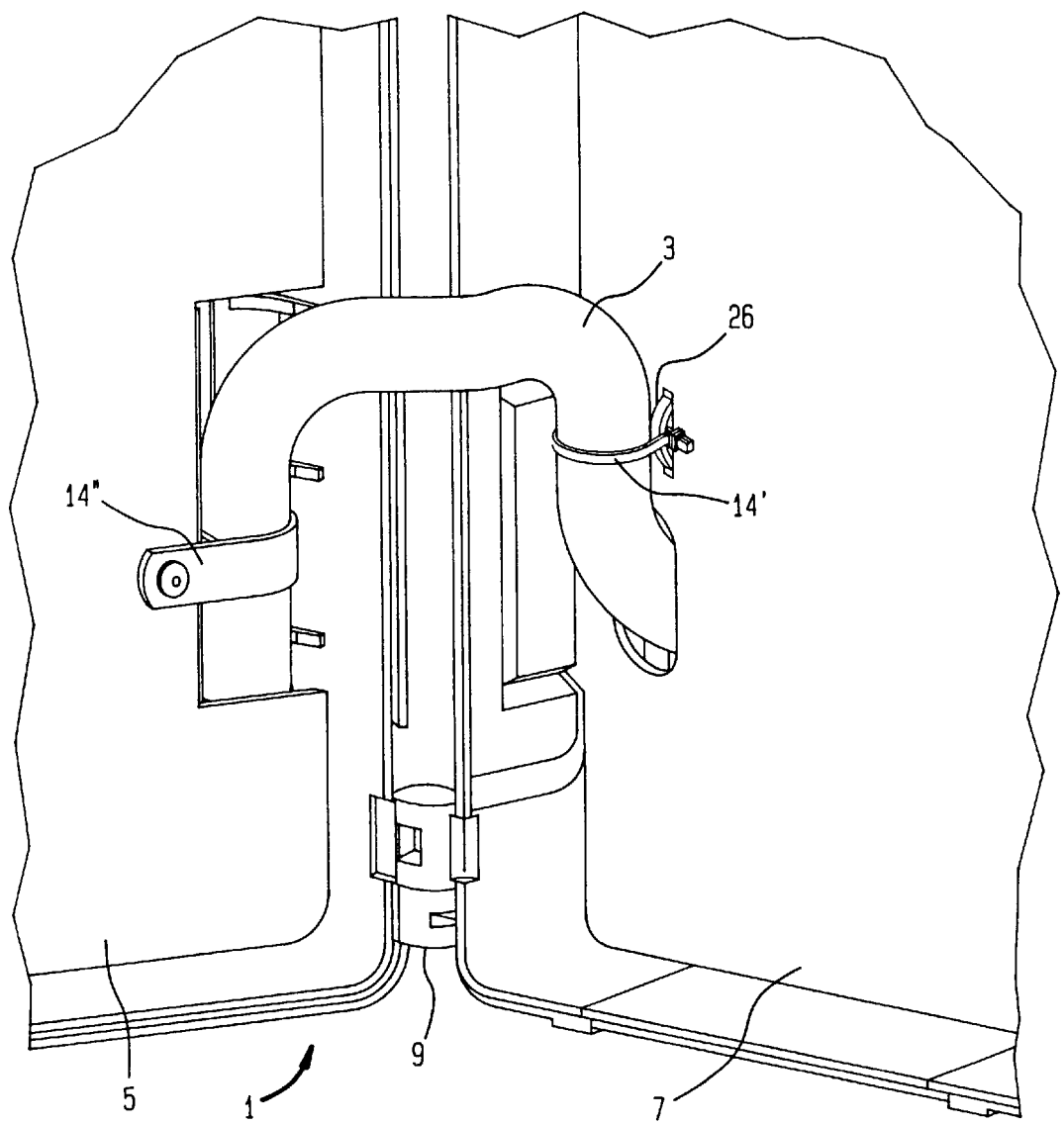
FIG. 6 is a front perspective view of a multilayered wiring unit in an open position constructed in accordance with a second embodiment of the present invention.

In an alternate embodiment, shown in FIG. 6, connecting cable 3 is inserted into a pair of gripping wire guides 14. In an exemplary embodiment, gripping wire guide 14' is a tie wrap that grips connecting cable 3 and is then looped through a ring 26 fixed to bottom wiring layer 7 so that connecting cable 3 is securely gripped to wiring layer 7. Alternatively, gripping wiring guide 14 may be a sleeve that surrounds connecting cable 3 and is securely fastened to a wiring layer. Such alternate securement is also shown in FIG. 6, where connecting cable 3 is secured to top wiring layer 5 by a riveted wiring guide 14". Because connecting cable 3 is firmly retained by gripping wire guides 14', 14", it is necessary that sufficient slack exist in connecting cable 3 so that top wiring layer 5 can be fully opened without having stretching forces applied to connecting cable 3 between gripping wire guides 14', 14". Of course, the person of skill, utilizing the teachings herein, will recognize that the guides 14 may be selected from numerous types of cable securement devices, provided that cable 3 is retained with sufficient strength within the guide to achieve the above-described twisting of the cable during opening and closure. Thus, the gripping force may be such that no rotation of cable 3 is permitted within one or both guides 14', 14", or some degree of rotation of the cable within the guide is permitted, depending on cable characteristics.

Figure 7:
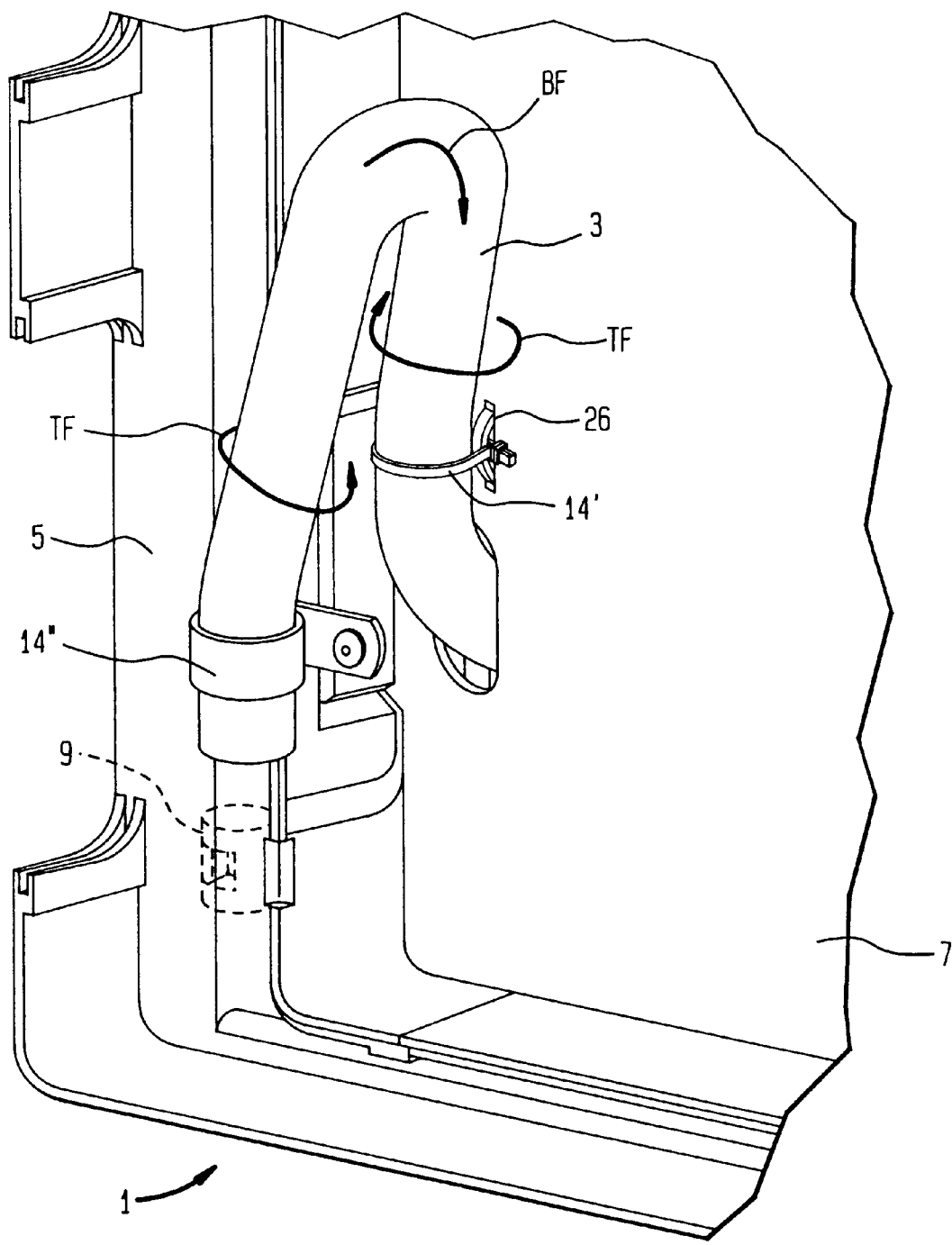
FIG 7 is a front perspective view depicting a cable within the multilayered unit of FIG. 6 when in the closed position.
Figure 8:
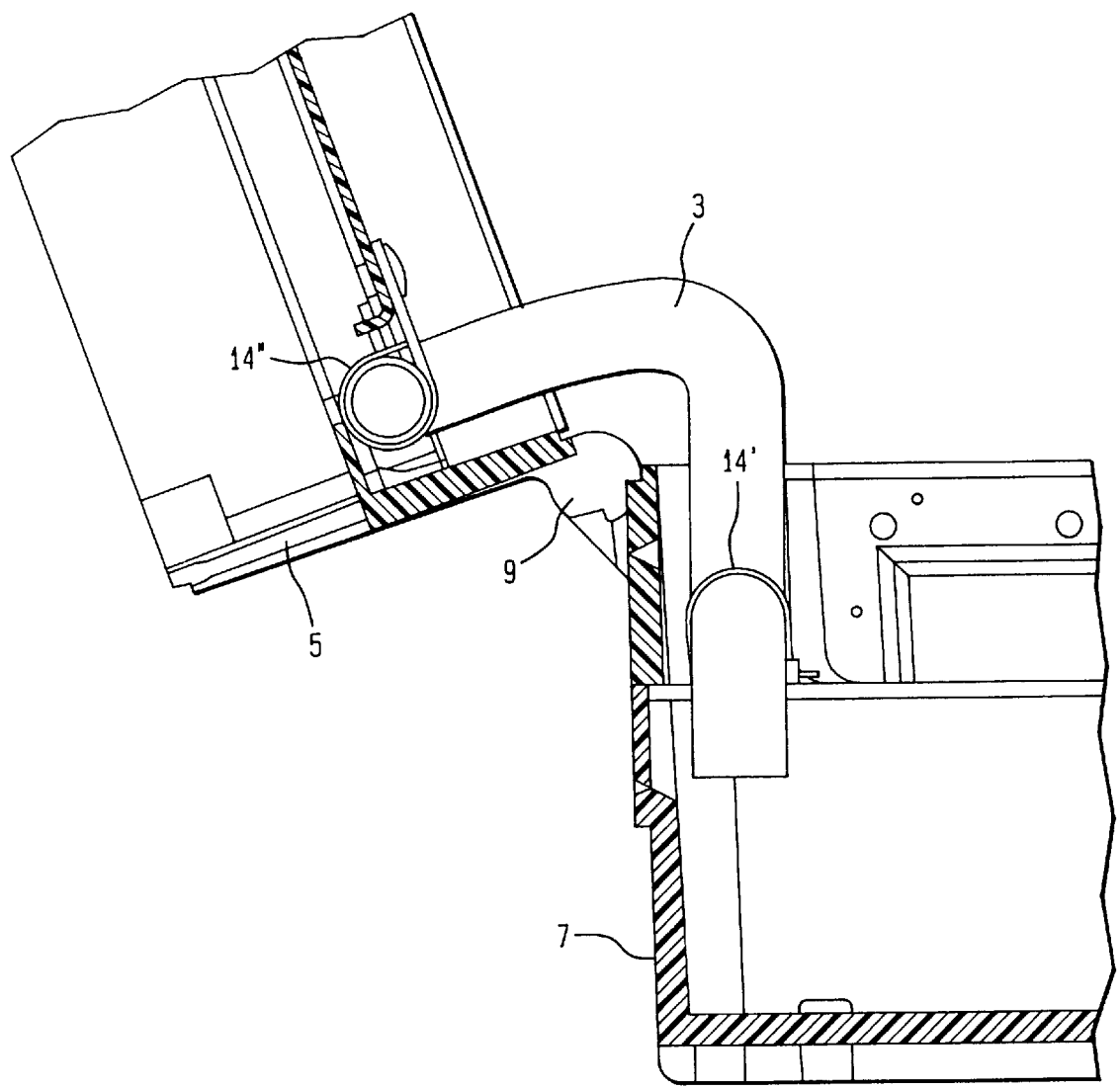
FIG. 8 is a tom cutaway view of the multilayered wiring unit of FIG. 6.
Figure 9:
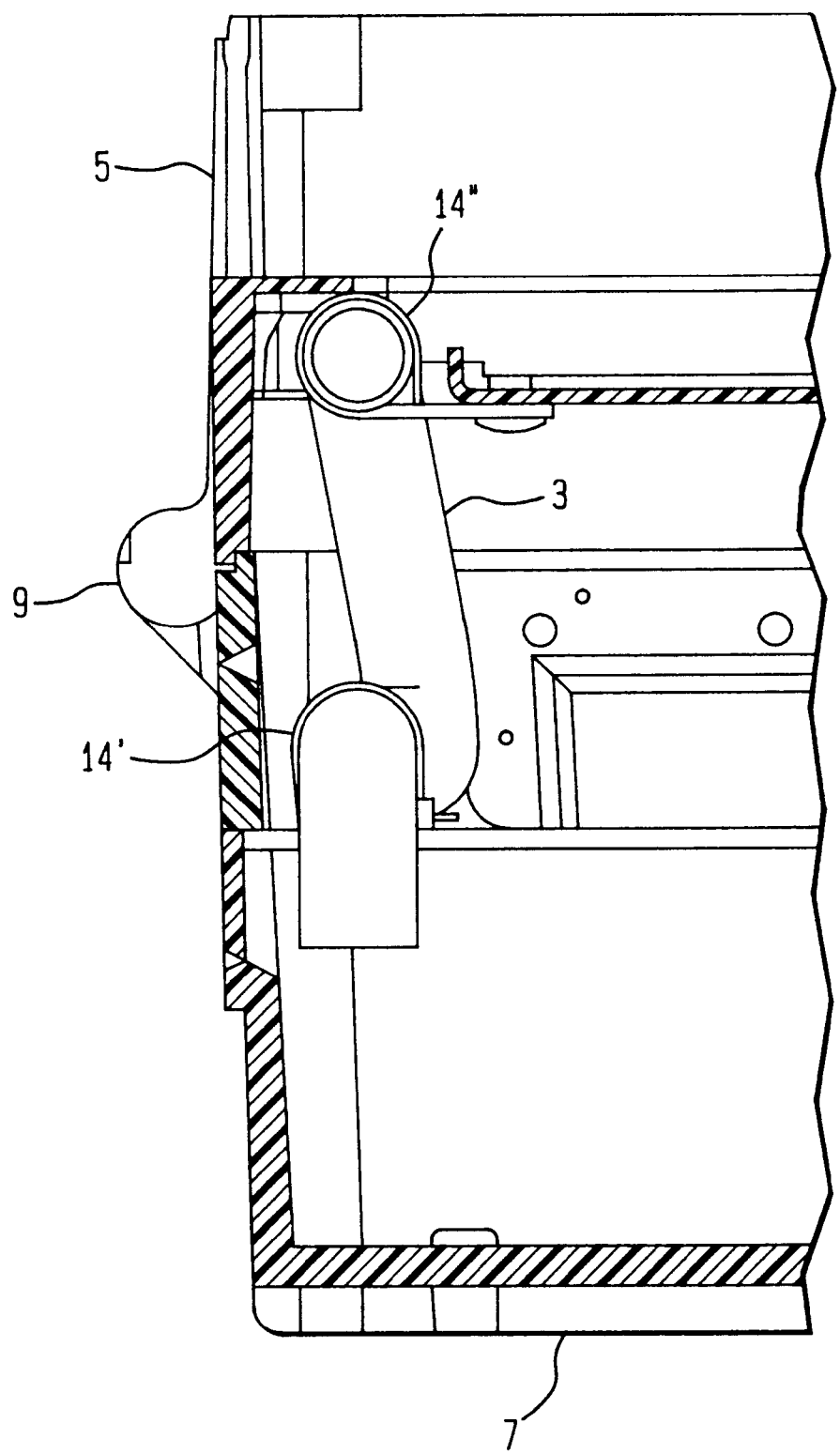
FIG. 9 is a bottom cutaway view of the multilayered wiring unit of FIG. 7.

As shown in FIG. 7, connecting cable 3 is channeled through gripping wire guides 14, 14' so that connecting cable 3 generally forms a U-shape as it traverses hinge 9 when multilayered wiring unit 1 is moved to the closed position. When top wiring layer 5 of multilayered wiring unit 1 is closed, as described above, both twisting or rotational (TF) and bending forces (BF) are applied to the U-shaped portion of connecting cable 3 that extends across hinge 9 and above gripping wire guides 14', 14". As described above, because part of the force applied to connecting cable 3 is directed to twisting connecting cable 3, the bending stress and wear on connecting cable 3 is reduced and the reliability of connecting cable 3 is greatly increased.

The invention may also be carried out using a combination of wire guides 13 and gripping wire guides 14. By way of non-limiting example, bottom layer wiring guide 13', which does not grip connecting cable 3, may be used in conjunction with gripping type wiring guide 14" fixed to top wiring layer 5. Similarly, other combinations of wire guides 13 and gripping wire guides 14 may be used as long as sufficient slack exists in connecting cable 3 enabling top wiring layer 5 to be fully opened and so that connecting cable 3 is subjected to twisting and bending forces and follows a generally U-shaped path across hinge 9 when multilayered wiring unit 1 is closed, thereby extending its life.

Although by way of example herein the invention is applied to a multilayered wiring unit depicted as a telephone network interface unit, it should be recognized that this invention is applicable to any situation or structure in which a multi-conductor or single conductor cable or wire, or single strand wire, or bundled or unbundled group thereof, traverses a hinge or other pivoting structure and, absent the invention, undergoes bending stress and wear as a result of movement between an open and closed position or as a result of any repetitive change in angle of the hinged or pivoted structure.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A multilayered wiring unit for reducing the wear on a wire, comprising:
   a first wiring layer;
   a second wiring layer pivotably attached to said first wiring layer by a hinge for pivotable movement from an opened position, in which said second wiring layer is pivoted away at an angle from said first wiring layer, to a closed position, in which said second wiring layer is in confronting overlying relationship with said first wiring layer; and
   a pair of wire guides comprising a first wire guide disposed on said first wiring layer and a second wire guide disposed on said second wiring layer, said pair of wire guides formed to guidedly cause a wire to traverse a path extending from said first wiring layer to said second wiring layer across said hinge such that when said second wiring layer is moved into said closed position, said wire is subjected to both rotational and bending forces.

2. The multilayered wiring unit of claim 1, further comprising a third wire guide disposed on said first wiring layer in a position offset from said first wire guide.

3. The multilayered wiring unit of claim 2, further comprising a fourth wire guide on said second wiring layer in a position offset from said second wire guide.

4. The multilayered wiring unit of claim 1, wherein at least one selected wire guide of said pair of wire guides grips said wire.

5. The multilayered wiring unit of claim 4, wherein said wire guide is a tie wrap.

6. The multilayered wiring unit of claim 1, wherein said pair of wire guides are ring-shaped and made from resilient plastic.

7. The multilayered wiring unit of claim 1, wherein said wire conform to a generally U-shaped path when traversing said hinge.

8. The multilayered wiring unit of claim 7, wherein said U-shape has a top, and the distance from said top to said first wire guide is approximately 2½ inches.

9. The multilayered wiring unit of claim 1, wherein the distance between said first wire guide and said second wire guide when said second wiring layer is in said closed position is approximately 2½ inches.

10. Apparatus for reducing the wear on a wire subject to bending forces comprising:
    a first wire guide on a first side of a pivot; and
    a second wire guide on a second side of said pivot and angularly pivotably moveable relative to said first guide by an angle, and said first and said second guides being so oriented that a wire guided through said guides across said pivot is subjected to both rotational and bending forces as said second wire guide is angularly pivotably moved in a direction which causes said angle to decrease.

11. The apparatus of claim 10, wherein said first wire guide comprises a plurality of wire guides.

12. The apparatus of claim 11, wherein said second wire guide comprises a plurality of wire guides.

13. The apparatus of claim 10, wherein said second wire guide comprises a plurality of wire guides.

14. The apparatus of claim 10, wherein at least a selected one of said first and said second wire guides is formed to retainingly grip said wire.

15. A method of reducing wear on a wire, comprising the steps of:

causing said wire to be guided by a first wire guide on a first side of a pivot;

directing said wire across said pivot; and causing said wire to be guided by a second wire guide on a second side of said pivot and angularly pivotably moveable relative to said first guide by an angle, said second guide being so oriented relative to said first wire guide that a wire guided through said guides across said pivot is subjected to both rotational and bending forces as said second wire guide is angularly pivotably moved in a direction which causes said angle to decrease.

16. The method of claim 15, further comprising the step of causing at least one of said first and said guides to grip said wire.

* * * * *